March 24, 1970   C. D. MERILATT   3,502,108
PILOT OPERATED VALVE
Filed Dec. 15, 1966   2 Sheets-Sheet 1
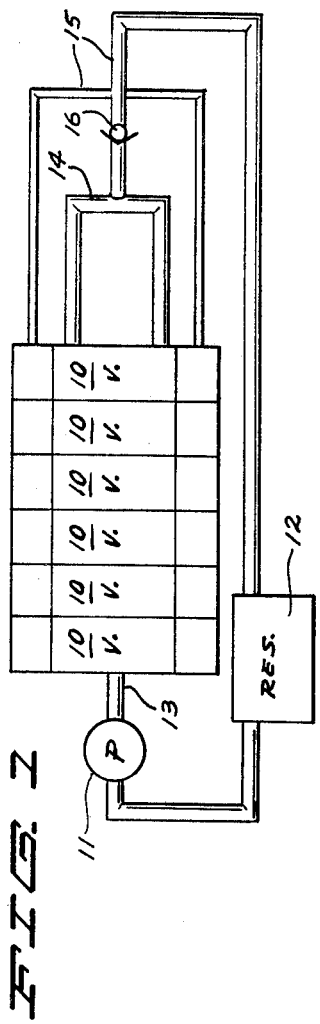
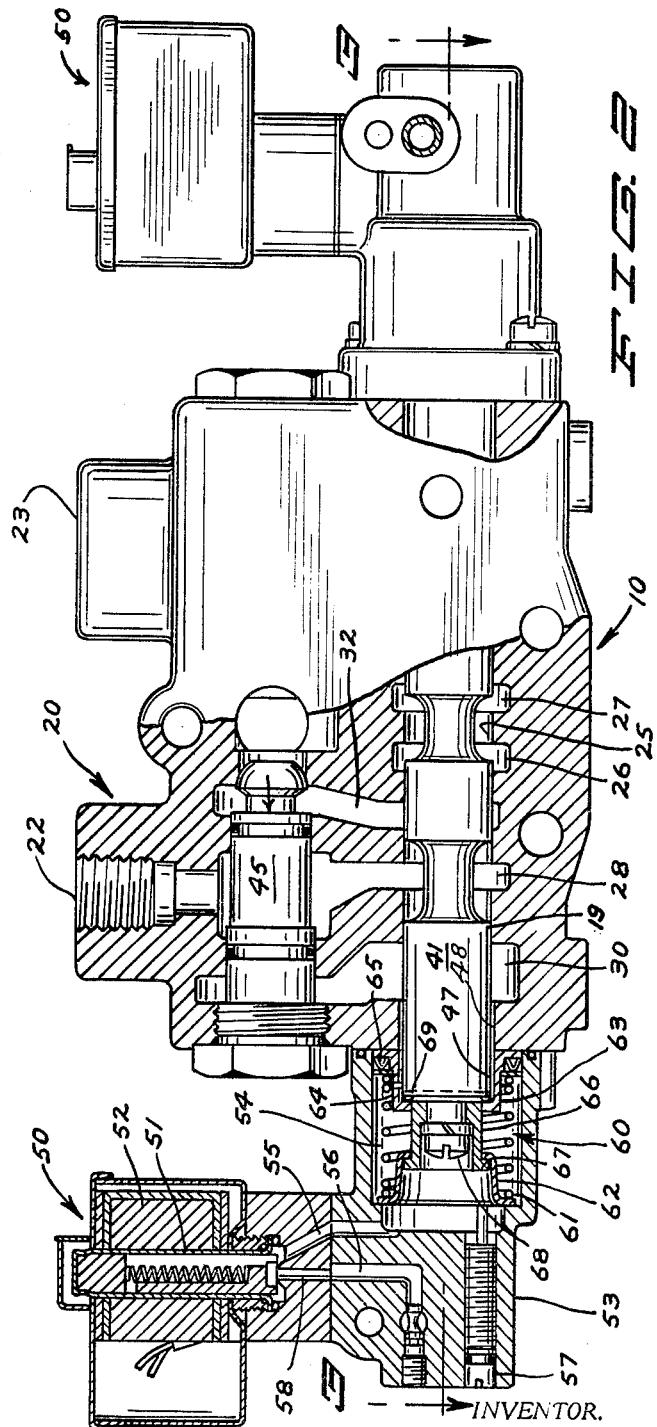
INVENTOR.
CLYDE D. MERILATT
BY
Carlsen, Carlsen & Sturm
ATTORNEYS

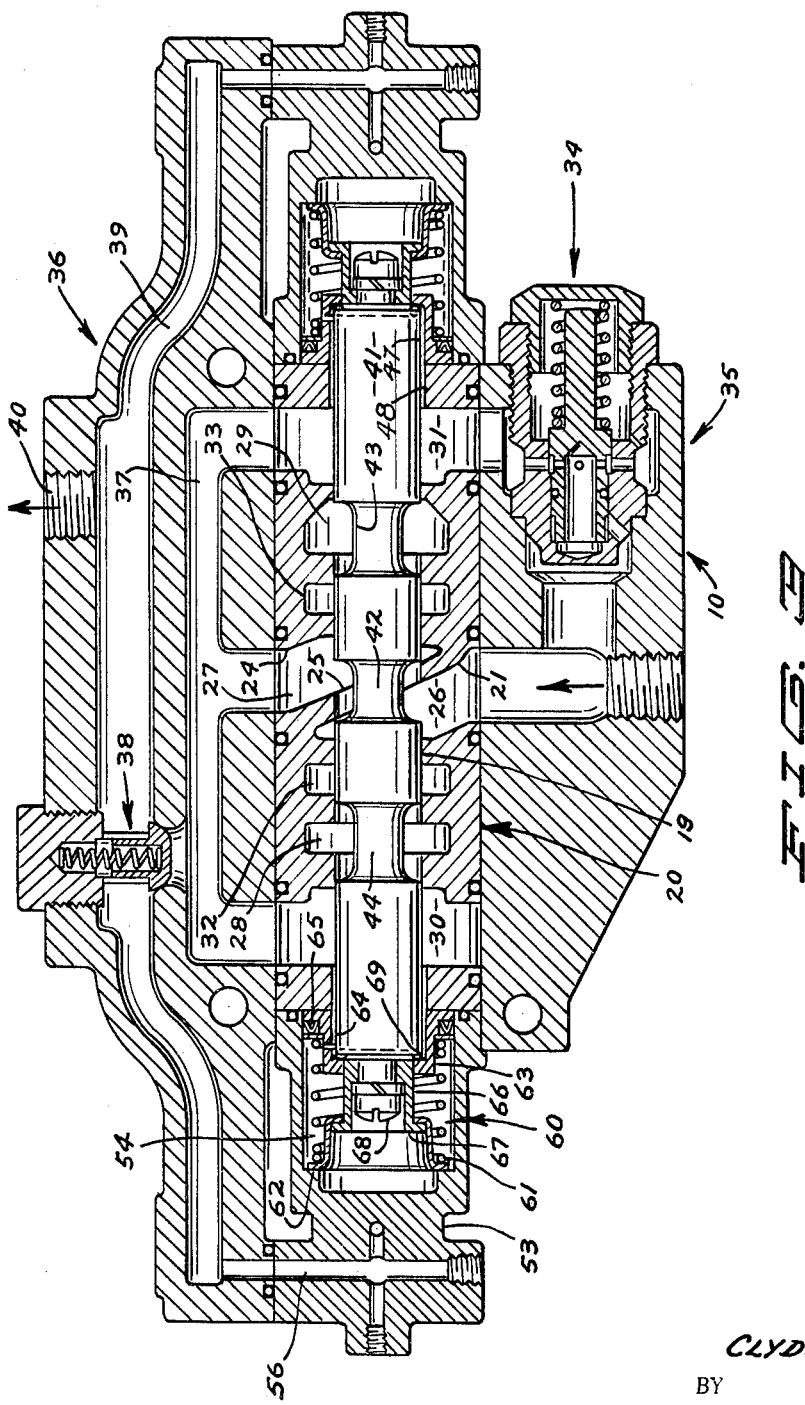

United States Patent Office 3,502,108
Patented Mar. 24, 1970

3,502,108
PILOT OPERATED VALVE
Clyde D. Merilatt, Mounds View Village, Minn., assignor to Gresen Manufacturing Company, Minneapolis, Minn., a corporation of Minnesota
Filed Dec. 15, 1966, Ser. No. 602,091
Int. Cl. F16k 11/07, 31/12
U.S. Cl. 137—625.6                 9 Claims

ABSTRACT OF THE DISCLOSURE

A pilot operated fluid valve using back pressure in chambers enclosing the ends of a valve spool to selectively actuate the valve spool and having a valve spool centering deactivating arrangement to allow actuation of the valve spool at substantially reduced pressures. A part of the valve spool centering apparatus is designated to act as a pressure differential operated piston in one direction only in response to the release of pressure in a chamber adjacent the end of a valve body and valve spool. This serves to inactivate the valve spool centering apparatus and to allow the flow of fluid to a second like chamber on the other end of the valve body to provide a pressure force on the opposite end of the valve spool.

---

This invention relates generally to fluid controlling valves and is more particularly directed to pilot operated fluid valves.

In the prior art with which my invention is concerned, the high pressures involved in primary control valves have, in the past, dictated severe operating force requirements for actuating the valve spool to selectively connect a source of fluid under pressure to a fluid operated device. This is a problem that can be easily handled by suitable mechanical linkages where direct forces are applied to the valve spool as by manual means. The problem is substantially greater when considering the class of valves to which my invention pertains, namely pilot operated valves in which it is desired to perform the actuation of a primary valve spool with relatively low power at low pressures so as to increase the speed of operation and increase the over-all efficiency of a hydraulic system. Considering, for example, the class of pilot operated fluid valves which utilize a back pressure for actuating a primary valve spool, any decrease in the amount of back pressure required for actuation of the primary valve spool contributes materially to the over-all efficiency of the system.

Prior art apparatus has provided both inlet and outlet-back pressure actuating systems for primary control valve spools in connection with suitably operable pilot valve assemblies which may, for example, comprise of electrically operated solenoid valves or other classes of valves that may be easily operated from a position remote to the location of the primary control valve. Some of the prior art devices have utilized a piston-like member attached to the end of a primary valve spool and disposed in a suitable chamber with appropriate valving means for controlling the flow of fluid to supply a force on the piston in the appropriate direction. Other forms of pilot operated valves have utilized the end of the valve spool itself which may act as a piston when enclosed in a suitable chamber therefor and suitable means, under the control of pilot operated valves is used in conjunction with the chamber disposed over the ends of the primary valve spool to apply fluid under pressure or control the flow of fluid from the chamber filled with fluid under pressure to effect the desired movement of the primary valve spool to control the flow of fluid under pressure through the primary valve to the fluid operated devices controlled by the operation of the valve. In substantially all of the prior art devices, it is desirable to have a suitable means for positioning the primary valve spool in a neutral position from which it may be actuated to perform the desired controlling functions and this has been generally accomplished by means having no relationship to the function of the pilot valve control of the position of the primary valve spool.

As will be set forth in greater detail below, my invention comprises a pilot operated valve including a primary valve spool having a neutral position provided by a positioning mechanism that is automatically rendered ineffective upon operation of pilot valves connected to chambers disposed over the ends of the piston to substantially reduce the force required to actuate the primary valve spool to a control, or active, position with respect to its valve body.

It is therefore an object of my invention to provide a novel and improved pilot operated valve.

Another object of my invention is to provide a pilot operated fluid valve having an increased speed of operation.

A still further object of my invention is to provide a pilot operated fluid valve which requires substantially less pressure for operation of the pilot operating apparatus.

A still further object of my invention is to provide a pilot operated fluid valve having increased efficiency of operation.

These and other objects of my invention will become apparent from a consideration of the appended specification, claims and drawings, in which—

FIG. 1 shows a partially sectionalized elevation view of a pilot operated fluid valve assembly incorporating the principles of my invention;

FIG. 2 is a schematic diagram of a hydraulic system in which valves of the class with which my invention is concerned may be utilized; and FIG. 3 is a sectional view of the valve shown in FIG. 2 taken along section line 3—3.

Briefly, my invention is shown embodied in a pilot operated valve assembly 10 which includes a primary valve body 20, a primary valve spool 41 and a pair of like solenoid pilot valve assemblies 50 disposed on each end of valve body 20.

Referring to FIGS. 2 and 3 of the drawing in which like elements have been identified by like reference characters, valve body 20 is shown having an inlet port 21, a pair of power ports 22 and 23, an outlet port 24 and a center port 25. A plurality of chambers are shown disposed axially of valve body 20 and include an inlet chamber 26, an outlet chamber 27, a pair of power chambers 28 and 29, a pair of chambers 30 and 31 and a further pair of inlet chambers 32 and 33. The chambers may be connected through suitable ducts and/or manifolding members to respective inlet power and outlet ports in any one of several arrangements well known to those skilled in the art to which my invention pertains.

An inlet manifold 35 is shown disposed and in fluid sealing communication with the side of valve body 20 at the lower portion of FIG. 3 of the drawings and includes, for purposes of illustration only, a duct connected directly to inlet port 21 and valve body 20 and a pressure relief valve assembly 34 disclosed in a duct connected intermediate exhaust chamber 31 in valve body 20 and the inlet to inlet manifold 35.

A tank manifold member 36 is shown having an exhaust duct 37, a check valve 38, a tank duct 39 and a tank outlet 40 to provide suitable external interconnections of the several chambers and ducts provided in valve bdoy 20 and in the pilot valve assemblies 50.

A primary valve spool 41 is shown slidably disposed in a suitable bore, 19, in valve body 20 and in the embodiment shown extends outwardly of each end of valve body 20. Primary valve spool 41 includes a centrally disposed center port groove 42 and a further pair of symmetrically disposed fluid controlling grooves 43 and 44 and is operative in the manner well known in the art for selectively controlling the flow of fluid into and out of power ports 22 and 23 from inlet port 21 and exhaust port 40 on tank manifold 36.

In the illustrative embodiment of FIGS. 2 and 3, the primary control valve portion is shown having the configuration utilized in connection with well known open center type valves which, in normal operation, are in a neutral position when the valve spool is centered to allow the unobstructed flow of fluid through a center port 25 from inlet to outlet ports. When the center port is restricted, a pressure build-up occurs in inlet port 21 and is applied to a pressure responsive check valve assembly 45 that is disposed in a duct intermediate inlet port 21 and further inlet chambers 32 and 33, shown disposed axially of the bore 19 in valve body 20, and proper axial disposition of primary valve spool 41 serves to selectively interconnect one or the other of the further inlet chambers 32 and 33 to one or the other of the power ports 22 and 23 connected to power chambers 28 and 29. It should also be noted that primary valve spool 41 is of substantially constant diameter and that the diameter of bore 19 intermediate the ends of valve body 20 and the adjacent exhaust chambers 30 and 31 is slightly larger to provide a radial clearance and in effect, a radial ring or axially extending radial duct 48 to allow the flow of fluid therethrough.

A pilot valve assembly 50 is shown disposed over each end of the bore extending through valve body 20 and because each is of the same construction, only the left hand valve assembly will be described and subsequently identified in detail. Each of the solenoid valve assemblies 50 includes a solenoid actuator 51 that includes a valving portion, a coil winding 52 that is adapted for connection to a suitable source of electric current (not shown) and a body 53 having a chamber portion 54 disposed over the ends of bore 19 and valve body 20, a valve duct 55, an exhaust duct 56 and an adjustable primary valve spool stop member 57. A suitable valving port 58 is shown disposed intermediate valve duct 55 and exhaust duct 56 and is adapted to operatively coact with the lower portion of solenoid actuator 51.

A pair of primary valve spool centering means 60 are shown disposed in the respective chambers 54 in the solenoid valve assemblies and in operative engagement with primary valve spool 41 to maintain the same in a neutral pisition in the absence of the selective operation of solenoid valves 50. Centering means 60 are each comprised of a centering spring 61, an outer collar 62 and an inner collar 63, having a suitably disposed orifice 64, and a peripheral sealing ring 65 in slidable sealing engagement with the inner wall of chamber 54 in solenoid valve assembly 50. A radial ring orifice 47 is shown exaggerated in size as the clearance between the inside of collar 63 and spool 41. Orifice 47 is preferably smaller than orifice 48. A spool extension member 66 having a collar at its outer end is shown slidably disposed through outer and inner collars 62 and 63 and is securely attached to the outer end of primary spool valve 41 through the use of a suitable screw threaded fastening means 68. An O-ring seal 69 is shown disposed on the outer face of each end of primary valve spool 41 for sealing engagement with the inwardly facing portion of the center part of inner collar 63 and outwardly of orifice 64 extending through inner collar 63.

Referring now to FIG. 1 of the drawings, a typical complete hydraulic system is shown in which a fluid reservoir 12 is shown connected through a suitable pump 11 and a duct 13 to a plurality of pilot operated valve assemblies 10 of the type with which this invention is concerned. It may be seen that duct 13 would be connected to the inlet orifice on an inlet manifold 35 which would be disposed on the left hand pilot operated valve assembly 10. In a similar manner, the tank manifold 36 would be disposed on the tank side of the right hand pilot operated valve assembly 10 to provide the connections shown schematically as ducts 14, check valve 16 and tank ducts 15 connected in turn to reservoir 12. With the ability of one skilled in the art and the disclosure of the other figures on the drawing, it is believed that the system of FIG. 1 and other suitable hydraulic control systems may be constructed utilizing the principles of my invention.

OPERATION

In operation, inlet manifold 35 will be connected to a suitable source of hydraulic fluid under pressure and the tank port 40 on tank manifold 36 will be connected to a return tank line. Power ports 22 and 23 may be connected, for example, to a suitable fluid motor such as a double acting hydraulic cylinder. The application of fluid under pressure to inlet port 21 on valve body 20 will result in a fluid flow through inlet chamber 26, center port 25 and outlet chamber 27 to outlet port 24 through exhaust duct 37 to exhaust chambers 30 and 31 and through check valve 38, tank duct 39 and tank port 40 to the hydraulic reservoir of the system. Check valve 38 serves to provide a predetermined back pressure in exhaust duct 37 and in chambers 30 and 31. The fluid present in exhaust chamber 31 will flow through radial orifices 48 at each end of valve body 20, orifices 47, and orifices 64 in inner collar members 63 to fill chambers 54 in each of the body portions 53 of solenoid valve assemblies 50. The centering means 60 will serve to maintain primary valve spool 41 in the position shown in the drawings as a result of the equal pressure existing in chambers 54 in each of the de-energized solenoid pilot valve assemblies 50.

When it is desired to operate valve 10, one or other of the pilot valve assemblies 50 may be energized from a source of electric current. Assuming that left hand valve assembly 50 is energized, its solenoid actuator 51 will be raised to open valve port 58 in valve body 53 and allow the flow of fluid from chamber 54 through valve duct 55, valve port 58 to exhaust duct 56 that is in turn connected to tank duct 39 in tank manifold 36. Substantially simultaneously, the pressure differential existing across orifice 64 in inner collar member 63 allows it to act as a piston and because of the higher pressure existing in exhaust chamber 30 and the low pressure existing in the left portion of chamber 54 in valve body 53, inner collar 63, being slidably disposed on spool extension member 66, will move to the left and compress centering spring 61 to effectively remove any forces that were previously applied ot the left end of primary valve spool 41. The pressure existing in chamber 54 on right hand pilot valve assembly then supplies a force to the right hand end of primary valve spool 41. Any further fluid that may be necessary to fill chamber 54 in the right hand pilot valve assembly 50 will flow through radial orifice 47 and around the peripheral portion of the right end of primary valve spool 41, through orifice 64 in right hand pilot valve assembly 50 and into chamber 54 therein. It may be noted that as the displacement of primary valve member 41 to the left is increased, the seal effected by O-ring 69 disposed between the end of primary valve spool 41 and the inner portion of inner collar 63 is broken so that a substantial quantity of hydraulic fluid may flow into chamber 54 to maintain the desired pressure as primary valve spool 41 is displaced.

I claim:
1. A hydraulic valve comprising in combination;
   (a) a valve body including a longitudinal bore and inlet, outlet and power ports in fluid communication with inlet, outlet and power chambers disposed axially of said bore;
   (b) a spool member, slidably disposed in said bore and operative to selectively interconnect said chambers;

(c) further normally closed valve means, including a chamber adapted to receive the ends of said spool, sealingly disposed over each end of the bore of said valve body and including a fluid outlet;

(d) spool centering means disposed in the chambers in each of said further valve means, said centering means including fluid pressure responsive means for rendering said centering means ineffective;

(e) a fluid passage extending intermediate each of the chambers in said further valve means and the outlet chambers in said valve body; and (f) means associated with the outlet port in said valve body for maintaining an above tank pressure in at least one of said outlet chambers.

2. The apparatus of claim 1 in which the pressure responsive means in the spool centering means includes an orifice.

3. The apparatus of claim 2 in which the orifice in the fluid pressure responsive means is substantially smaller than the fluid passage extending intermediate the chambers in the further valve means and the exhaust chambers in the valve body.

4. The apparatus of claim 3 in which the fluid passage extending intermediate the chambers in the further valve means and the exhaust chambers in the valve body is comprised of a radial orifice disposed intermediate the spool member and the ends of the valve body.

5. The apparatus of claim 2 in which the centering means is a spring.

6. The apparatus of claim 1 in which the spool member and the valve body are provided with means for allowing the free flow of fluid intermediate the inlet and outlet ports when the spool member is in a centered position.

7. The apparatus of claim 6 in which the fluid pressure responsive means in the spool centering means includes an orifice.

8. The apparatus of claim 7 in which the orifice in the fluid pressure responsive means is substantially smaller than the fluid passage extending intermediate the chambers in the further valve means and the exhaust chambers in the valve body.

9. The apparatus of claim 8 in which the fluid passage extending intermediate the chambers in the further valve means and the exhaust chambers in the valve body is comprised of a radial orifice disposed intermediate the spool member and the ends of the valve body.

References Cited

UNITED STATES PATENTS

| 2,982,302 | 5/1961 | Fitzgibbon | 137—625.64 |
| 3,160,174 | 12/1964 | Schmiel et al. | 137—596.12 XR |
| 3,174,510 | 3/1965 | Nelson | 137—625.69 |
| 3,200,845 | 8/1965 | Nakazima et al. | 137—625.6 |
| 3,304,953 | 2/1967 | Wickline et al. | 137—596.12 |
| 3,315,702 | 4/1967 | Passaggio | 137—625.64 |
| 3,340,897 | 9/1967 | Nevulis | 137—625.6 |
| 2,641,279 | 6/1953 | Baldwin | 137—625.6 |

HENRY T. KLINKSIEK, Primary Examiner